United States Patent [19]

Gehani et al.

[11] Patent Number: 5,802,062

[45] Date of Patent: Sep. 1, 1998

[54] PREVENTING CONFLICTS IN DISTRIBUTED SYSTEMS

[75] Inventors: Narain H. Gehani, Summit; Alex Kononov, Bridgewater; Michael Rabinovich, Gillette, all of N.J.

[73] Assignee: AT&T Corp, Middletown, N.J.

[21] Appl. No.: 666,772

[22] Filed: Jun. 19, 1996

[51] Int. Cl.$^6$ ............................................. G06F 13/376
[52] U.S. Cl. ....................... 370/465; 370/522; 707/201
[58] Field of Search ................................. 370/445, 465, 370/449, 522, 450, 451, 452, 453, 466, 467; 395/182.01, 182.08, 726, 800.01; 364/284; 707/1, 8, 10, 200, 201, 202, 203, 204

[56] References Cited

U.S. PATENT DOCUMENTS

| | | | |
|---|---|---|---|
| 4,949,302 | 8/1990 | Arnolde et al. | 395/616 |
| 5,046,002 | 9/1991 | Takashi et al. | 395/608 |
| 5,542,046 | 7/1996 | Carlson et al. | 395/186 |
| 5,627,961 | 5/1997 | Sharman | 395/182.04 |
| 5,634,122 | 5/1997 | Loucks et al. | 395/608 |
| 5,644,698 | 7/1997 | Cannon | 395/182.04 |

*Primary Examiner*—Alpus H. Hsu
*Assistant Examiner*—Kwang B. Yao
*Attorney, Agent, or Firm*—Karin L. Williams

[57] ABSTRACT

A token-based protocol used to prevent conflicts between copies of the same data items residing in different servers of a replicated distributed system is provided. The servers in the system with database replicas are provided with token pointers that are each associated with a token. Token pointers are used to track the current possessor of the token. Whenever a server receives or transfers a token, its corresponding token pointer is updated to reflect which server possesses the token. The use of token pointers advantageously eliminates the need for global cooperation by the servers to regenerate a lost token.

14 Claims, 8 Drawing Sheets

PREVENTING CONFLICTS IN DISTRIBUTED SYSTEMS

FIELD OF INVENTION

The present invention relates to a distributed processing system and, more particularly, to preventing conflicts among copies of the same data item within the distributed system.

BACKGROUND OF INVENTION

In distributed systems, access to data items is often facilitated by database servers. A database server provides storage of data items grouped into databases. An application running on a client station, such as a personal computer, can access a data item by connecting to the database server that stores the corresponding database. A common scenario associated with distributed systems is that some clients are geographically located a great distance away from the server. Access to the database by these clients is generally by remote connections, e.g., dial up connections. Remote connections can incur long distance charges which result in added cost. Also, remote connections tend to increase system response time, thereby decreasing system performance. To improve performance and reduce cost in distributed systems, copies or replicas of the database are stored on multiple servers, each advantageously located in proximity to various groups of clients. Such systems are known as replicated distributed systems.

However, the existence of multiple copies of the same data item requires database management protocols to prevent conflicts between copies. "Conflicts", as used herein, refer to the scenario where two or more copies of the same data item each contain different modifications. One technique of preventing conflicts from occurring is to ensure that all changes to the same data item are serialized and always applied to the most current version. This involves assigning a unique token, as a permission to make changes, for all copies of the same data item. Thus, the number of tokens in the system is equal to the number of data items in a database replica. Unless the server possesses the token associated with a specific data item, it cannot perform modifications to that data item.

A problem with token-based systems is that the token can be lost as a result of a server failure or communication delays during token transfer. Recovery of the lost token requires regeneration of the token by the system. Conventional token regeneration techniques, such as those described in S. Nishio, K. F. Li and E. G. Manning, "A Time-Out Based Resilient Token Transfer Algorithm for Mutual Exclusion in Computer Networks", *Proceedings of the IEEE Int. Conf. on Distributed Computing Systems*, 1989, pp. 386–393 (broadcast-based regeneration), involve executing a distributed consensus protocol to identify the server that has the most current copy of the data item and to agree on which server regenerates the token. This necessitates numerous exchanges of broadcast messages among the servers, which increases message traffic in the network. Clearly, such protocols are impractical, particularly in low bandwidth networks (or where the network is operating at or near its bandwidth capacity) or where communication cost for connections to the network is high. In addition, broadcast regeneration protocols require global cooperation among the servers in the system, which means that all servers in the network must be simultaneously operational before the token can be regenerated. Thus, the unavailability of one or more servers creates problems in regenerating the token. Also, these protocols force all servers on the system to be interrupted from their normal operations while the token is being regenerated. From the above discussion, it is apparent that there is a need for an improved token-based protocol.

SUMMARY OF INVENTION

In a replicated distributed system having copies of a database located on different servers, a token-based protocol for preventing conflicts between copies of the same data item residing on different servers is provided. As used herein, the term "servers" refers to servers with database replicas as well as to those servers on which conflicts are to be prevented. The protocol advantageously enables regeneration of a lost token without the need for global cooperation among the servers. This advantage is achieved by providing servers with token pointers to keep track of the server possessing the token. In one embodiment, a token pointer is associated with each token in the system.

Each time a server receives or forwards a token to another server, it updates its token pointer associated with the token to identify the current possessor of that token. The protocol, in some instances, may not necessarily inform the server ($server_a$) which requested the token as to which server actually possesses the token. For example, if the server ($server_b$) identified in the requesting server's token pointer has subsequently transferred the token to another server ($server_c$) other than the requesting server, then $server_a$'s token pointer will no longer point to the server that actually possesses the token. In this case, $server_b$ requests the token from $server_c$ on behalf of $server_a$. According to one embodiment, $server_c$ sends the token to $server_b$ which forwards it to servera, the original token requestor. Thus, a token pointer provides to the token requestor a nexus, directly or indirectly (via an intermediate server), to the server possessing corresponding token.

The protocol involves at most two servers at any instant during a token request, i.e., the server issuing the token request (requester) and the server receiving the token request (requestee). Due to this feature, there is no need for broadcasting messages to the servers in the system to determine which server has the token. Furthermore, the protocol determines that a token is lost when the requestor or requestee thinks that the other has the token, but neither does. If the token is lost, then it last existed in either the requestor or requestee. In accordance with one embodiment, the server which possesses the more current copy of the data item is the server which last had the token and is responsible to regenerate the token. As such, successful regeneration of a lost token need only to involve the requestor and requestee. Therefore, the protocol eliminates the need for global cooperation among the servers in the system.

DETAILED DESCRIPTION OF THE INVENTION:

The invention relates to a token-based protocol which prevents conflicts. The protocol provides efficient regeneration of a token after it has been lost by eliminating the need for lost global cooperation of all servers with a database replica. As previously discussed, conventional token-based protocols require both global participation by all the servers as well as several rounds of broadcast messages to regenerate the token after it has been lost. This can lead to increased cost and system downtime.

Figure 1:
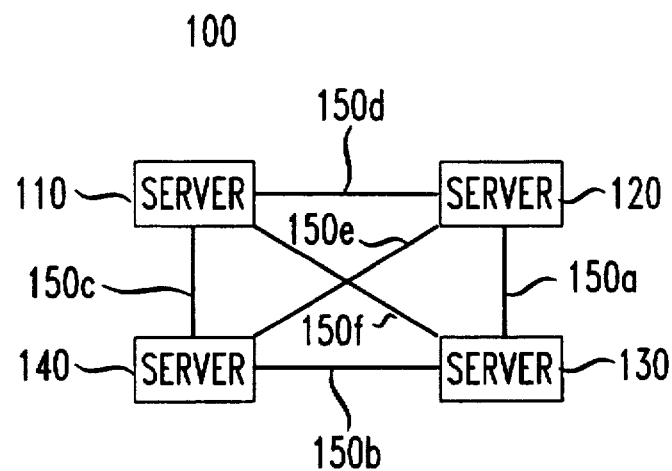
FIG. 1 is a simplified illustration of a conventional replicated distributed system.

FIG. 1 is a simplified illustration of a conventional replicated distributed system 100. Such systems are described in Berson, Client/Server Architecture, McGraw-Hill, Inc., 1992, herein incorporated by reference for all purposes. Distributed system 100 comprises sites 110, 120, 130, and 140 networked together by communication links 150a–150f. The physical implementation of the communication links is not important. For example, the communication links may be a local area network (LAN) or a wide area network (WAN) interconnecting sites at geographically dispersed locations. The sites may also be "loosely connected", i.e., connected through dial-up connections or wireless connections such as satellite links.

Figure 2:
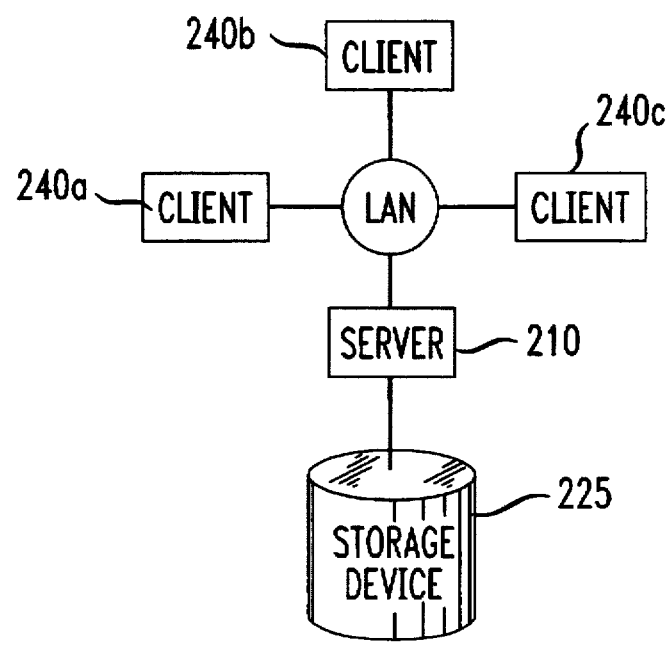
FIG. 2 is an exemplary site within the distributed system of FIG. 1.

FIG. 2 is an exemplary site 200 of the distributed system. As shown, the site includes a plurality of clients 240a–240c networked to a server 210 by a LAN, MAN, or WAN. The clients, for example, may be personal computers, workstations, or terminals. Other clients (not shown) may be connected via remote links. While the clients are shown to be associated with a particular site, it is understood that they may connect to other servers at other sites within the system using remote links, such as dial-up connections using modems, wireless connections such as satellite links, or connections via the internet. Furthermore, it is understood that clients may have similar or different configurations from each other, and other clients (not shown) may be included as desired. In addition, one or more clients may be located on the server. Server 210 is, in some embodiments, a mainframe computer system, a workstation, or a personal computer that includes non-volatile storage device 225, such as magnetic disks or optical disks for data storage. The data being stored in the storage device 225 includes data files which are organized into one or more groups called databases. Each individual data file in the databases is referred to as a data item.

Referring back to FIG. 1, a copy or replica of the same database is stored in the memory of the servers located at sites 110, 120, 130 and 140. For sake of brevity, servers 110, 120, and 130 refer to servers located at sites 110, 120, 130 and 140, respectively. Furthermore, the servers at each site may also be referred to as nodes. The clients at the various nodes provide users with an interface to communicate with servers to read and update data items. An "update" refers to an operation which modifies one or more data items. When updates are made to one replica, these updates are propagated to other servers during a replication session to make all replicas consistent with each other. Conventional update propagation techniques such as those described in *Lotus Notes Release 3 Application Developers Reference Manual*, 1993, Lotus Development Corporation, Cambridge, MA., can be employed to maintain replica consistency.

Typically, update propagation is scheduled between a source and recipient server. The source or recipient server identifies which copies of data items in the source replica are more current than their corresponding copies in the recipient replica. The source server then propagates the more recent copies or updates to the recipient server. To facilitate identification as to which copy of the same data items are more recent, version information such as version numbers described in D. K. Gifford, "Weighted Voting for Replicated Data", *Proceedings of the 7th ACM SIGOPS Symposium on Operating Systems Principles*, (1979), pp. 150–159, or other conventional techniques for identifying versions of data items are used. Version information are associated with the data items. Each time a copy of the data item is modified, its corresponding version information is updated. By comparing version information of two copies of the same data item, a determination as to which copy is more current can be made. Whenever a server acquires a more current copy of a data item from another server, it also acquires the version information associated with that copy of the data item.

In accordance with the protocol of the invention, servers in the system having a database replica maintain pointers that are associated with each token. These pointers are herein referred to as TokenHolders. Since the number of tokens is equal to the number of data items in a replica, the number of TokenHolders in each server is also equal to the number of data items. In order to simplify the description of the protocol, illustrative embodiments are described using one TokenHolder per server (i.e., I data item per database replica). However, it will be understood that the protocol is applied on a per-data item basis. Also, to facilitate ease of discussion, a subscript variable (e.g.,) is used to denote any server in the system and its corresponding components.

The pointers are used to keep track of the server possessing the token. In one embodiment, TokenHolder$_i$ identifies either 1) to which server server$_i$ forwarded the token or 2) itself in the case where server$_i$ has the token. Server$_i$ modifies TokenHolder$_i$ each time it transfers or receives the token. For example, after server 110 forwards the token to server 120, TokenHolder$_{110}$ will contain information identifying server 120, such as server 120's server identification (SID) and TokenHolder$_{120}$ will contain its own SID.

When a client connected to server$_1$ sends a request to update, for example server$_1$'s copy of data item x in server$_i$ it determines whether or not it has the token associated with x. If server$_1$ has the token, it services the update request. Otherwise, server$_i$ sends a token request message to the server (server$_a$) identified in TokenHolder$_i$. If server$_a$ does not have the token, server$_a$ examines its TokenHolder$_a$ and forwards a token request message to server$_b$ (which is identified in TokenHolder$_b$) on behalf of the server$_i$. This request chain continues until the server possessing the token is reached. Assuming that server$_b$ has the token, one embodiment of the protocol calls for server$_b$ sends the token to server$_a$ which then sends the token to server$_i$. After the transfer of the token by each server, its respective TokenHolder is appropriately updated. As a result, TokenHolder$_b$ will contain server$_a$'s SID while TokenHolder$_a$ and TokenHolder$_i$ will contain server$_i$'s SID.

As apparent from the above description, TokenHolder$_i$, in some instances, may not necessarily inform server$_i$ who exactly is the possessor of the token. However, the pointers, at the very least, provide a nexus to the server that actually holds the token. This technique of updating the pointers enables a requesting server to obtain the token from the possessor, either directly or indirectly via an intermediate server. As such, token requests are serviced without broadcasting messages system wide and waiting for the token possessor to respond to the message. To avoid loss of information during, for example, server failures, TokenHolders may be stored in non-volatile memory of the servers.

In the case where the token is lost, the request chain continues indefinitely because no server in the system has the token. Eventually, a situation occurs where the requester thinks that the requestee has the token and vice-versa, but neither does. At this point, the system is aware that the token is lost. Furthermore, the token last existed in either the requester and requestee. Since this is the case, regeneration of the token need only involve these two servers. The server which possesses the more recent version of x is the server which last had the token. As such, this server regenerates the token. Thus, the protocol advantageously regenerates the token without requiring global cooperation of all servers in the system with database replicas.

Figure 3A:
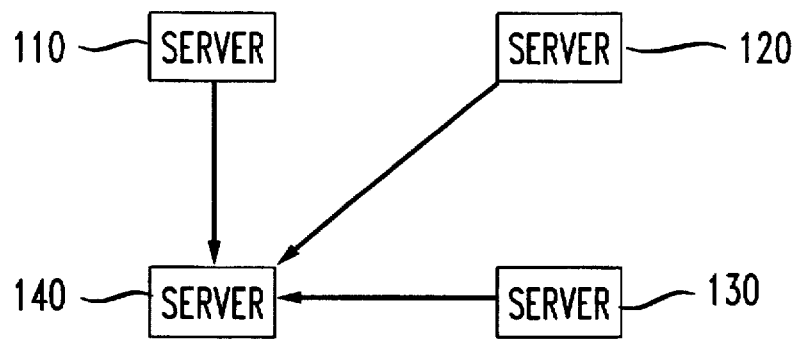
FIGS. 3a–e are examples of servers and the contents of its respective token pointer.

FIGS. 3a–3e are illustrative examples showing the dynamics of TokenHolder in replicated distributed system 100. The arrows identify the server to which each server's TokenHolder points. During initialization of system 100, a server is designated to generate tokens for the data item in the database. At this time, it is not important which server generates the tokens since all data item replicas should be identical. Referring to FIG. 3a, server 140 is chosen to generate the token associated with data item x. As a result, the TokenHolder associated with x at server 110, 120, and 130 all point to server 140 while the TokenHolder$_{140}$ points to itself.

Figure 3B:
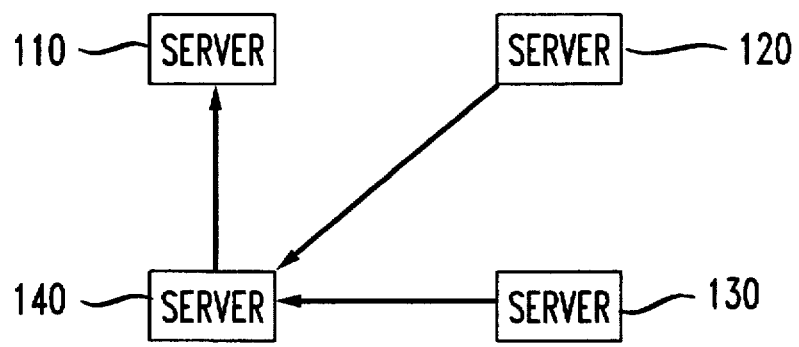

Referring to FIG. 3b, server 110 requests the token from server 140. After server 140 releases the token to server 110, it updates its TokenHolder$_{140}$ to reflect that server 110 now has the token. Upon receipt of the token, server 110 updates its TokenHolder$_{110}$ to show that it has the token. However, the TokenHolders for servers 120 and 130 remain unchanged, pointing to server 140 as the possessor of the token even though it is not. As a result, any token request message originating at either 120 or 130 is sent to server 140, which then relays the request on behalf of the requesting server to server 110. Unless the token is lost, the request chain eventually reaches the possessor of the token.

Figure 3C:
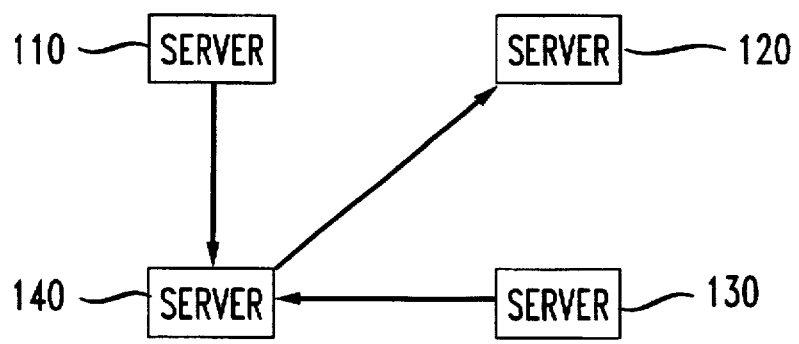

In FIG. 3c, server 120 subsequently requests the token from server 140. Upon receiving the request, server 140 relays this request to server 110 which has the token. Server 140 releases the token to server 140 from which it received the request. Server 140, upon receiving the token from server 110, releases it to server 120. The sequence of token transfers causes servers 110, 120 and 140 to update their respective TokenHolders as follows. Server 110's TokenHolder$_{110}$ points to server 140; server 140's TokenHolder$_{140}$ points to server 120; and server 120's TokenHolder$_{120}$ points to itself. Since server 130 was not involved in the token transfer process, its TokenHolder$_{130}$ remains unchanged.

Figure 3D:
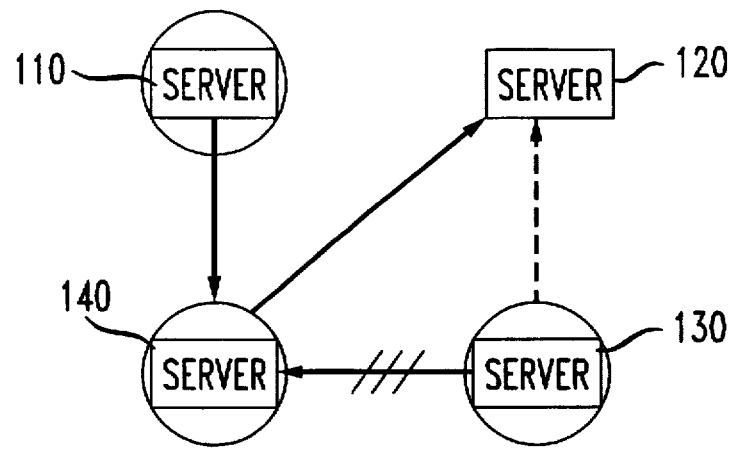
Figure 3E:
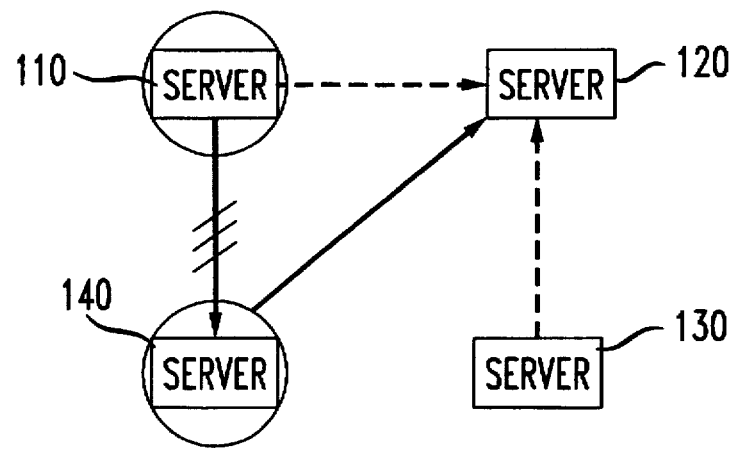

The token request by server 140 results in a request chain which includes server 140 and 110. However, this request chain may be collapsed when necessary to include only server 110 if the update propagation between any two servers includes propagating the contents of TokenHolder. FIG. 3d illustrates an example of how the request chain is collapsed during update propagation. As shown, the contents of the TokenHolders are similar to those shown in FIG. 3c. As part of the scheduled update propagation between source server 140 and recipient server 130, data item version information as well as its associated TokenHolder are propagated to the recipient server. The TokenHolder associated with the copy of the data item which has the most recent version information is the more current pointer. For example, if TokenHolder$_{140}$ is more current, its information is adopted by server 130 in its TokenHolder$_{130}$ during update propagation. As a result, server 130 now points to server 120 (dotted arrow). Thus, the request chain which previously included servers 110 (crossed out arrow) has been collapsed to point directly to server 120. Likewise, an update propagation session between servers 110 and 140, as shown in FIG. 3e, collapses the request chain, which previously included servers 140 and 120, to include only server 120.

From FIGS. 3a–3c, the server possessing the token releases the token to the previous server in the token request chain, regardless of whether or not it is the original token requester. As a result, the token reaches the original token requester by traveling back along the request path. Alternatively, if information identifying the original token requester is included in the token request message, the token can be forwarded directly to the original requester, thus eliminating the need for the token to reverse the request path in order to reach the original requesting server. After the transfer of the token, the TokenHolder of the server possessing the token will contain the SID of the original token requester. However, a side effect of this technique is that under some situations, it results in request chains that is longer than if information identifying the original requester is not included in the request message.

A token can become obsolete. An "obsolete token" is a token which the system cannot ensure that it is associated with the latest copy of a data item. This may create potential conflicts in copies of the data item. Situations which may make a token obsolete include, for example, arrival of a token at the requesting server after an error has occurred. Such error may be a server failure or a timeout error. A "timeout error" is defined as an error which results when the time it takes for a requester to receive the token exceeds the amount of time allotted by the system. This usually happens when a token message experiences unusually long delays or when the token is lost. The timeout error thus prevents a server from waiting indefinitely for a token which may never arrive.

To prevent an obsolete token from being inadvertently received by the requesting server, the protocol provides servers with a counter (tnumber) associated with each token. The tnumber records the number of times that the respective token had arrived at the respective server or the number of times that an error had resulted from a token request. The current value of tnumber is included in the request message sent by the requester (server$_a$). In addition, the tnumber of the requestee (server$_b$) is included in the token message which is sent back to server$_a$. When a token arrives at the server$_a$, it compares the contents of its tnumber$_a$ with that of tnumber$_b$. If tnumber$_a$=tnumber$_b$, then the token is not obsolete. Otherwise, server$_a$ discards the obsolete token. As such, the counter enables a server to detect and ignore an unexpected token message (i.e., obsolete) that can occur as a result of a server failure or error. The contents of the counters, in some embodiments, are stored in non-volatile memory to avoid being corrupted or lost during a server failure.

Storage of token counters in non-volatile storage requires a disk access every time a token counter is modified. To avoid the overhead associated with disk accesses, a different structure for token counters is employed. In accordance with one embodiment, each token counter comprises two components such as (age, counter). Age, which is stored in non-volatile storage, is incremented each time a server reboots, for example, from a server failure. Counter is stored in unstable storage and is incremented in the same manner as tnumber. Using the format, token counter, is defined to be greater than token counter$_2$ if and only if age$_1 \geq$ age$_2$ and counter$_1$>counter$_2$. As such, monotonicity of the token counters are maintained as required by the protocol However, modifying or reading the counters does not require a disk access.

In multi-processing environments, multiple processes can execute simultaneously. Concurrent execution of processes can cause potential conflicts between different copies of same data item in a replica. For example, client$_a$ and client$_b$, which are connected to the same node, request independent updates to the same data item at the same time. Unless some controls are placed in the system to serialize the update requests, a conflict will exist between client$_a$'s and client$_b$'s copy of the data item. These conflicts are referred to as intra-node conflicts. To avoid intra-node conflicts, conventional concurrency controls such as lock variables are provided for the servers. Concurrency controls and locks are described in J. Gray and A. Reuter, *Transaction Processing: Concepts and Techniques*, Morgan Kaufmann, San Mateo, Calif., 1991, herein incorporated by reference for all purposes.

Locks are associated with node resources, such as routines used to service token requests. Typically, two operations are associated with each lock variable, lock and unlock. To serialize parallel activities, only one process can successfully lock (or acquire) a lock variable at any one time. If other processes desire to acquire that lock variable, their requests are placed in a queue. Once the process which has acquired the lock variable unlocks (or releases) it, a waiting process is chosen from the lock queue as the next process by which to acquire the lock variable.

In accordance with one embodiment, the servers are provided with two lock variables, requesting and token associated with each token The use of a requesting lock variable ensures that a request for a specific token from the same server is not issued unless the previous request for that token has been serviced. This prevents requesting the token twice. This lock variable also prevents a token from being transferred to another server until it is released by the server possessing it. The token lock prevents concurrent accesses of a token by multiple processes. (This is a standard concurrency control within the server.)

Figure 4:
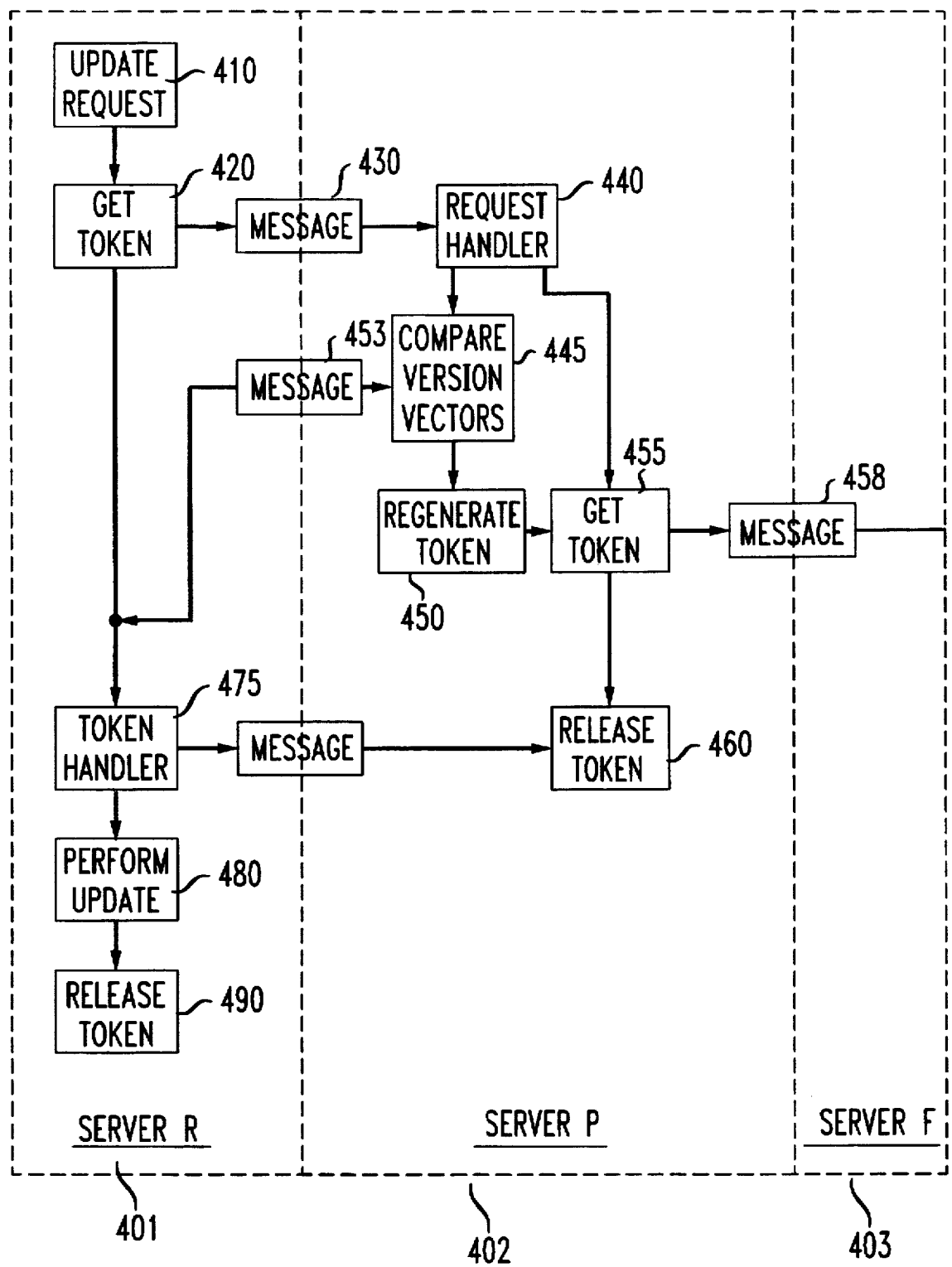
FIG. 4 is a flow diagram depicting the steps obtaining a token.

Referring to FIG. 4, a flow diagram depicting how a server acquires a token in accordance with an illustrative embodiment of the invention is shown. The flow diagram is separated into sections 401, 402, and 403. Section 401 reflects actions executed by the server (server$_a$) issuing the original token request, while section 402 reflects action executed by the server (server$_b$) receiving the request. Section 403 indicates actions executed by an additional server (server$_c$), if necessary, in the request chain. At step 410, server$_a$ receives an update request for a data item x. At step 420, in response to the update request, server executes a routine (GetToken) to obtain the token. The GetToken routine examines server$_a$'s TokenHolder$_a$ associated with x to determine which server in the system possesses x' token. If server$_a$ already has the token, it proceeds to step 475. If GetToken determines that another server (server$_b$) possesses the token, it sends a token request message at step 430 to the server$_b$. This request message includes server$_a$'s ID, server$_a$'s copy of x' version vector (vvector$_a$), and tnumber. Thereafter, server$_a$ waits for the token to return. To prevent server$_a$ from waiting indefinitely for the token, such as when the token is lost, a timeout mechanism is used. At the expiration of a predefined timeout period, GetToken informs server$_a$ that it is unable to retrieve the requested token.

Upon successful return of the token, GetToken proceeds to step 475. At step 475, after server$_a$ obtains the token, it executes a TokenHandler routine. TokenHandler checks the tnumber of the token to make sure that it is not obsolete by comparing tnumber with tnumber$_a$. If the token is not obsolete, server$_a$ updates it.

Otherwise the token is ignored, TokenHolder$_a$ to reflect that server$_a$ now has the token. At step 480, server$_a$ performs the client's update request and releases the token to a requesting server at step 490 by executing a ReleaseToken routine. The ReleaseToken routine identifies the requesting server and updates TokenHolder$_a$ to point to that server.

When server$_b$ receives the token request message from server$_a$, it can be in one of three states: 1) server$_b$ thinks server$_a$ has the token, 2) server$_b$ has the token, or 3) server$_b$ has forwarded the token to server$_c$. In response to the token request message, server$_b$ executes a RequestHandler routine at step 440. The RequestHandler examines TokenHolder$_b$ to identify the state of server$_b$. State 1 indicates a problem because neither server$_a$ nor server$_b$ has the token (both servers think the other has the token). This state typifies the scenario where a server which possesses the token experiences a failure or unusually long message delay. For example, server$_a$ issues a token request to server$_b$, which successfully fulfills this request, i.e, server$_b$ sends the token to server$_a$ and updates its TokenHolder to reflect this action. However, the token message to server$_a$ was delayed long enough for server$_a$'s request to timeout. The timeout causes server$_a$'s tnumber$_a$ to be incremented. Then, even if server$_a$ receives the token, it would be ignored because its associated tnumber$_a$ is obsolete (tnumber$_a \neq$ tnumber$_b$) As a result, the token becomes lost during transfer.

If RequestHandler determines that server$_b$ is in state 1, token regeneration is initiated. This includes comparing the vvector$_b$ of server$_b$'s copy of x to that of server$_a$ at step 445. If server$_b$'s copy of x is more recent, then server$_b$ is assumed to be the last server which had the token. Server$_b$ then regenerates and forwards the token to server$_a$. Token regeneration may be achieved by causing server$_b$ to imitate a token arrival by executing the TokenHandler routine at step 450. RequestHandler then proceeds to steps 455 and 460 to retrieve and release the token by executing the GetToken and ReleaseToken routines. The token, along with its copy of x, since it is more current, is sent to server$_a$ at step 470. If, on the other hand, server$_a$'s replica of x is more current, then server$_b$ assumes that server$_a$ was the last server that had the token, resulting in server$_b$ sending a message at step 453 to inform server$_a$ to regenerate the token.

If server$_b$ is in either state 2 or 3, RequestHandler executes the GetToken routine at step 455, which either executes ReleaseToken routine at step 460 and transfers the token to server$_a$ (state 2) or sends a token request message at step 458 to server$_c$ (state 3). Server$_c$ receives the token request message and processes it in a similar manner as server$_b$ at step 440. This process continues until the request chain reaches the server possessing the token.

Figure 5:
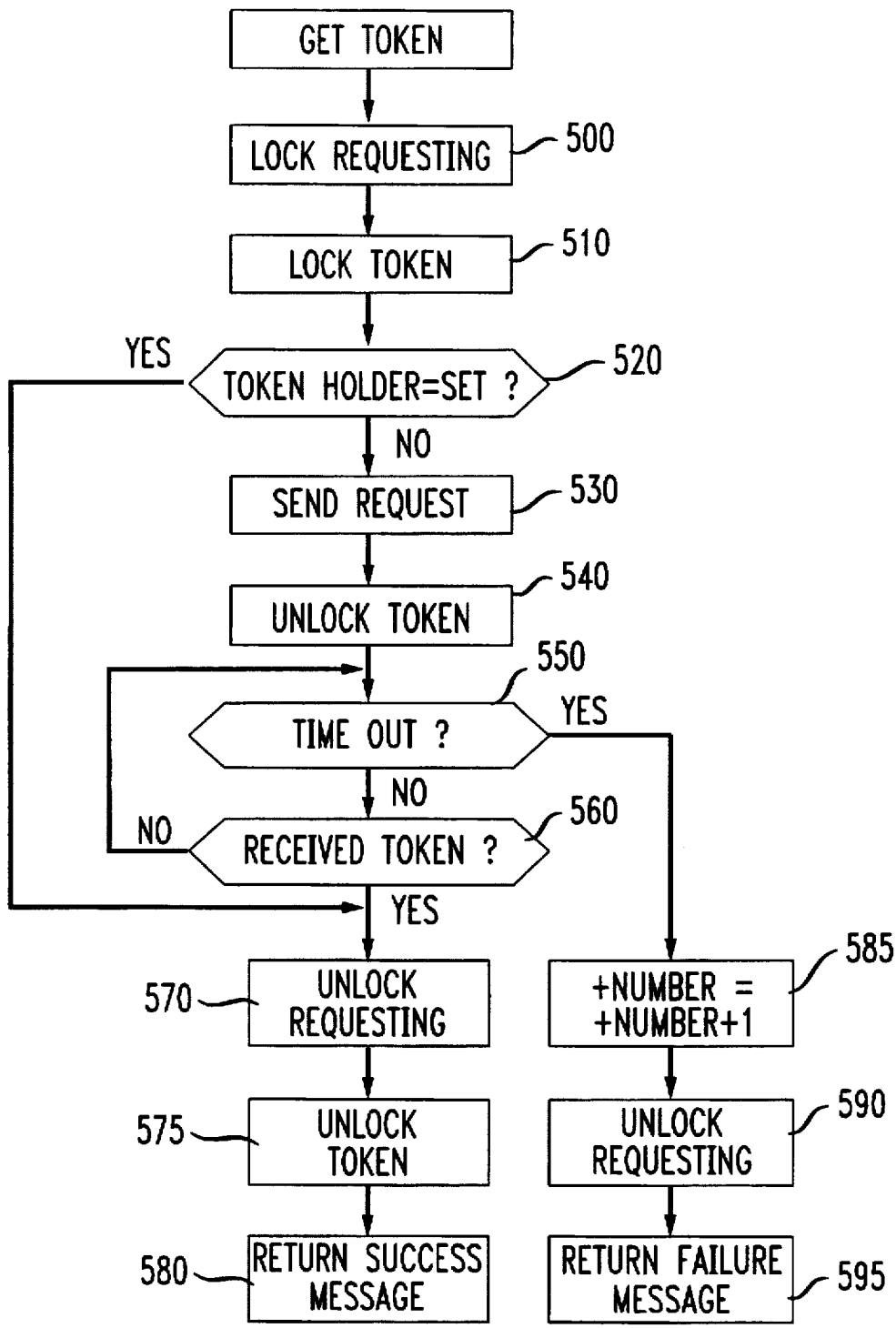
FIG. 5 is a flow diagram depicting the steps for GetToken routine.

Referring to FIG. 5, a detailed flow diagram of the GetToken routine is shown. At steps 500 and 510, the requesting and token lock variables are set to their lock states. Setting requesting to the lock state prevents server$_a$ from serving multiple token requests for the same token concurrent. In addition, the token variable is locked to avoid other processes from obtaining the token until the current process is finished updating the data item. At step 520, TokenHolder$_a$ is examined to identify which server in the system possesses the token. If server$_a$ already has the token, GetToken proceeds to step 570. If TokenHolder$_a$ points to server$_b$, GetToken sends a token request message to the server$_b$ at step 530. The message includes server$_a$'s SID, tnumber$_a$, information identifying the data item being updated and its associated version vector.

At step 550, GetToken then waits for the token to arrive or for a timeout to occur. If the token arrives before a timeout occurs, GetToken, at step 570 returns a success message to inform server$_a$ that the token has been successfully acquired. If a timeout occurs, GetToken increments tnumber by 1 and notifies server$_a$ that it failed to receive the token at step 590. An unsuccessful acquisition of the token causes GetToken to relinquish system resources to another process by releasing the concurrency controls, i.e., unlocking the requesting lock variables.

Figure 6:
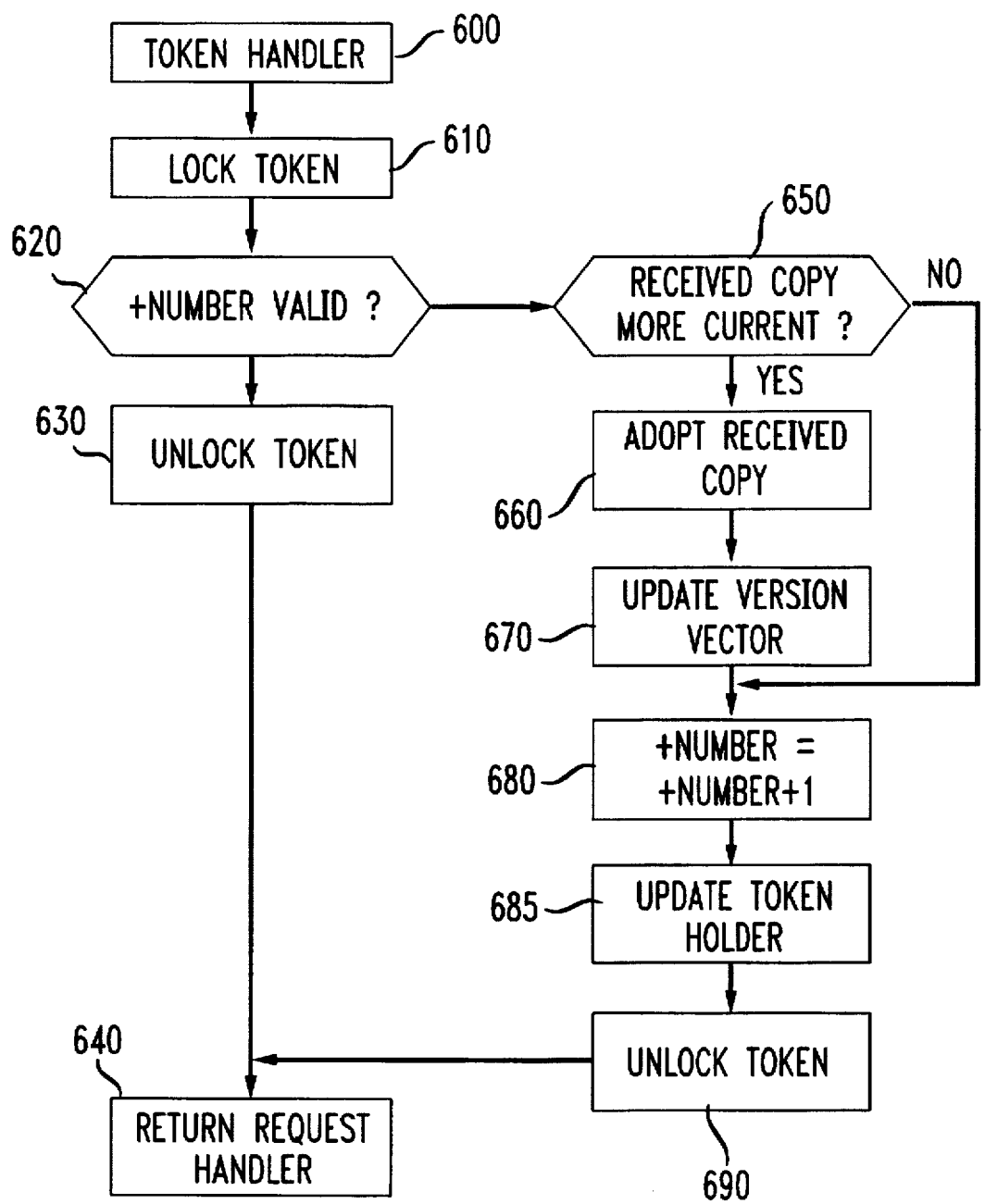
FIG. 6 is a flow diagram depicting the steps for Token-Handler routine.

FIG. 6 is a flow diagram of the TokenHandler routine in accordance with one embodiment of the invention. At step 600, server$_a$ executes the TokenHandler routine when a token message arrives from server$_b$. The token lock variable at server$_a$ is locked at step 710. At step 620, TokenHandler validates the token by comparing the token counter (tnumber) from server$_b$ with that of server$_a$. The token is valid when both counters are equal. If the vvector$_a$ token is valid, TokenHandler proceeds to step 650 and compares the vvector$_a$ with the vvector$_b$. If the comparison indicates that server$_b$'s copy is more current, server$_a$ adopts server$_b$'s copy of x at step 660. Server$_a$ then updates vvector$_a$ to equal vvector$_b$ at step 670 and proceeds to step 680. If server$_b$'s copy of the document is less current or identical to server$_a$'s copy, then server$_a$ does not need server$_b$'s copy of x. As such TokenHandler proceeds to step 680. At step 680, tnumber$_a$ is incremented to reflect the arrival of the token. At step 685, TokenHolder$_a$ is also updated to reflect that server$_a$ now has the token. After TokenHolder is updated, token lock is unlocked at step 690.

Figure 7:
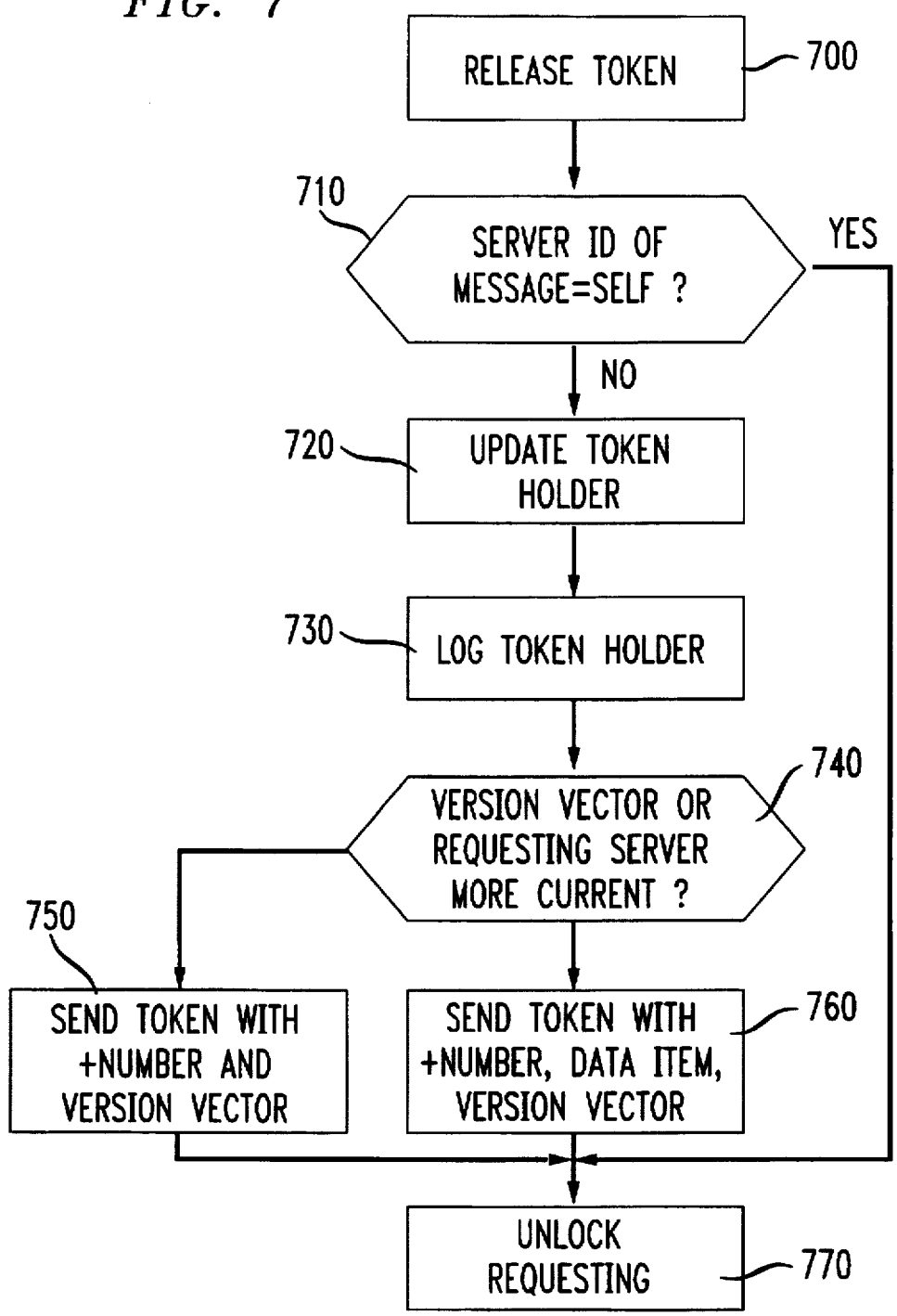
FIG. 7 is a flow diagram depicting the steps for Release-Token routine.

FIG. 7 is a flow diagram depicting the ReleaseToken routine. At step 700, server$_b$ receives a token request message from another server$_a$ and executes the ReleaseToken routine. The token request contains SID$_a$, tnumber$_a$ and vvector$_a$ from server$_a$. At step 710, the ReleaseToken determines whether the token request message originated from another server or from itself by comparing the SID$_a$ with its own SID. If they are equal, the request originated from itself and then proceeds to step 770. Otherwise, the request originated from another server. At step 720, the TokenHolder is updated with SID$_a$. Optionally, at step 730, the updated contents of TokenHolder is written to non-volatile memory. As previously discussed, this prevents TokenHolder from being lost if a server failure occurs.

At step 740, ReleaseToken compares the vvector$_a$ with vvector$_b$. If the server$_b$'s copy is more current than server$_a$'s copy, server$_b$ sends the token message which includes its tnumber$_b$ and its copy of the data item along with the vvector$_b$ information to server$_a$. Otherwise, server$_b$ only sends the tnumber$_b$ and its vvector$_b$ associated with its copy of the data item with the token message at step 750 because server$_a$ already has a more current copy of the data item. After the token message is sent, the request lock is reset to the unlock state.

Figure 8:
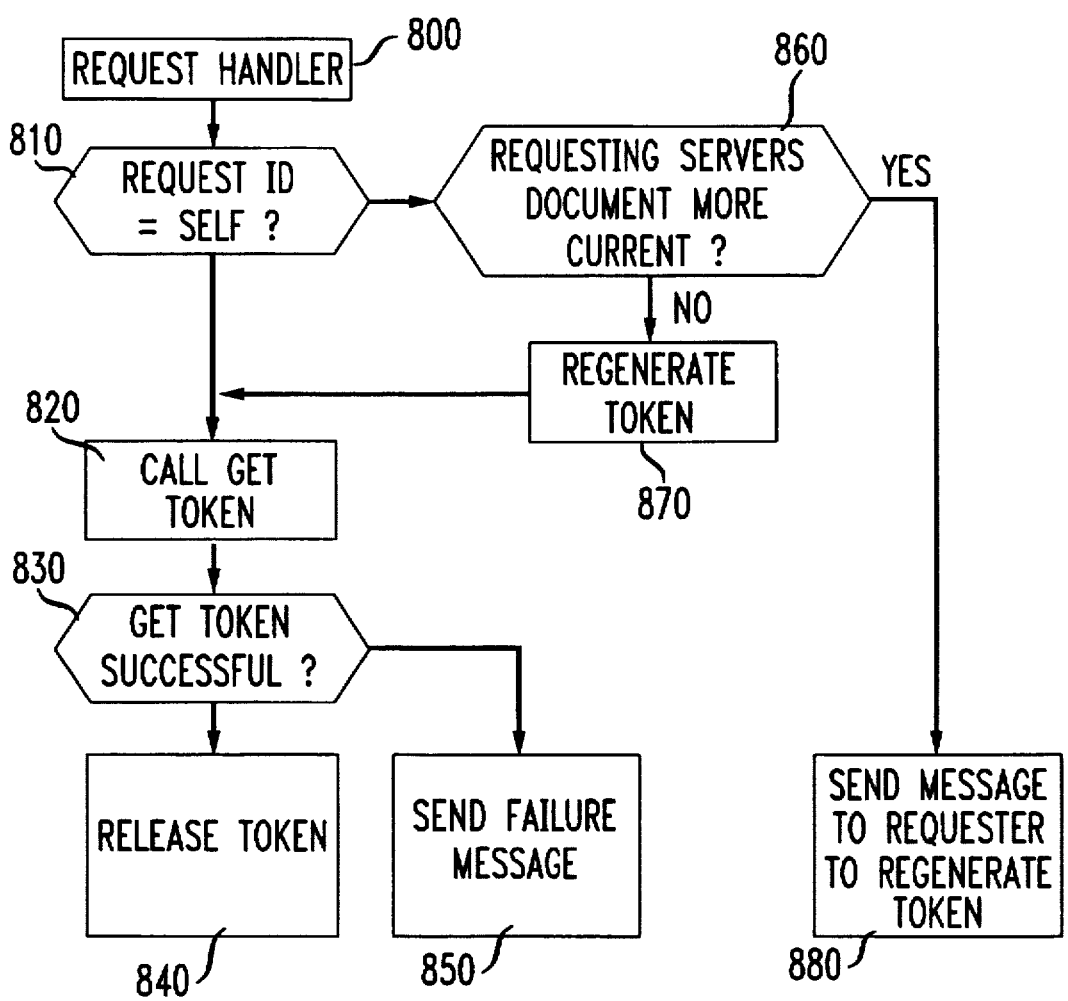
FIG. 8 is a flow diagram depicting the steps for Request-Handler routine.

FIG. 8 is a flow diagram depicting the RequestHandler routine. At step 800, server$_b$ receives a token request message from server$_a$ and executes the RequestHandler routine. The message includes SID$_a$, tnumber$_a$, and vvector$_a$. At step 810, the TokenHandler routine compares SID$_a$ with the contents of TokenHolder$_b$. If the two values are not equal, TokenHandler proceeds to step 820, where it calls GetToken. However, if the values where it calls GetToken are equal, the system proceeds to step 860. This indicates that the token for x is lost and needs to be regenerated. At step 860, server$_a$ compares the vvector$_a$ of its copy of x with vvector$_b$ to determine which server had the token last. If vvector$_b$'s is more current than vvector$_a$, a RequestHandler calls TokenHandler at step 870 to initiate regeneration of the token and proceeds to step 820. If server$_a$'S copy of x is more current, server$_a$ sends a token message to server$_b$ at step 880. The token message includes a zero vector, which is a vvector with all its components set to zero. This ensures that the data item associated with the zero vector is the least current. The token message and zero vector inform server$_a$ to regenerate the token since it was the last server to have the token.

At step 820, server$_a$ calls GetToken routine to generate the token. After the requested token returns successfully, at step 830 TokenHandler calls ReleaseToken routine which sends the token to server. However, if server$_b$ fails to retrieve the token, i.e., timeout, TokenHandler sends a failure message to server$_a$.

While the invention has been particularly shown and described with reference to various embodiments, it will be recognized by those skilled in the art that modifications and changes may be made to the present invention without departing from the spirit and scope thereof. The scope of the invention should therefore be determined not with reference to the above description, but instead should be determined with reference to the appended claims, along with their full scope of equivalents.

the invention claimed is:

1. In a computer network with a database comprising a plurality of data items, the network comprises a plurality of servers corresponding to a plurality of database replicas, each comprising copies of the plurality of data items, a method for preventing conflicts among the different copies of the same data item in the database replicas comprising the steps of:

providing a plurality of tokens corresponding to the plurality of data items, wherein possession of a token by one of the plurality of servers grants permission to said one of the plurality of servers to update a data item corresponding to the token in the server's database replica;

providing a plurality of token pointers in the plurality of servers corresponding to the plurality of tokens; and updating the token pointers to provide a nexus to said one of the plurality of servers with possession of the corresponding token.

2. The method of claim 1 further comprising the step of servicing a request by a client connected to the server, referred to as a requester, to update one of the plurality of data items in the requestor's replica, wherein the step comprises the steps of:

retrieving the token associated with the data item; and performing updates on the data item after the token has been retrieved.

3. The method of claim 2 wherein the step of retrieving the token comprises the steps of:

examining the requestor's token pointer corresponding to the token associated with the data item and if the requestor's token pointer identifies the requestor as the server with possession of the token, then it already has the token; and sending a token request message to a requestee server if the requestor's token pointer identifies the requestee as the server with possession of the token, where the requestee is not the same as the requestor.

4. The method of claim 3 wherein the token request comprises information identifying the requestor server identification (SID) and the version information associated with the data item.

5. The method of claim 4 wherein the version information associated with the data item is a version vector.

6. The method of claim 5 further comprises the step of servicing the token request wherein the step comprises:

examining the requestee's to determine the server with possession of the token; and i. releasing the token to the requestor if the requestee's token pointer identifies the requestee as the server with possession of the token, ii. forwarding an intermediate token request message on behalf of the requester to a second requestee if the requestee's token pointer identifies the second requestee as the server with possession of the token, where the second requestee is not equal to the requestee, and wherein the intermediate token request message comprises the requestee's SID and the version vector of the requestee's copy of the data item, and iii. regenerating the token if the requestee's token pointer identifies the requestor as the server with possession of the token.

7. The method of claim 6 where the step of releasing the token to the requestor comprises:

updating the requestee's token holder to reflect that the requestor is the server with possession of the token;

determining which copy of the data item is more current by comparing the version vector of the requestee's copy of the data item with the version vector of the requestor's copy of the data item; and sending a token message by the requestee to the requestor, wherein the token message comprises the version vector of the requestee's copy of the data item if the requestor's copy of the data item is more current and further comprising the requestee's copy of the data item to the requestee's copy if the data item is more current.

8. The method of claim 7 wherein the regenerating step comprises:

comparing requestee's version vector with requestor's version vector to determine which copy of the data item is more current;

sending a token regeneration message from the requestee to the requestor informing the requester to regenerate the token if the requestee's copy of the data item is more current; and if the requestee's copy of the data item is more current, regenerating the token by the requestee and releasing the token to the requestor.

9. The method of claim 8 wherein the token regeneration message comprises a zero version vector wherein the components of the zero version vector are set to zero.

10. The method of claim 7 further comprising the step of handling the token message by the requestor comprising:

comparing the version vector from the token message with the version vector of the requestor's copy of the data item to determine which copy of the data item is more current;

if the requestee's copy of the data item is more current, then i. adopting the requestee's copy of the data item into the requestor's database replica, ii. updating the requestor's version vector associated with the data item to equal the version vector of the requestee's copy of the data item, and iii. updating the requestor's token pointer to reflect that the requestor is the server with possession of the token; or if the requestor's copy of the data item is more current, then updating the requestor's token pointer to reflect that the requestor is the possessor of the token.

11. The method of claim 10 further comprises the steps of:

providing a plurality of token numbers in the plurality of servers, the plurality of token numbers associated with the plurality of tokens; and incrementing the requestor's token number in response to the requestor receiving the token.

12. The method of claim 11 further comprises the step of:

incrementing the requestor's token number after a token request timeout occurs.

13. The method of claim 11 wherein the step further comprises the steps of:

comparing the requestor's token number with the requestee's token number associated with the token;

receiving the token if the requestor's and requestee's token numbers are equal; and ignoring the token if the requestor's and requestee's token numbers are not equal.

14. A distributed system having a database comprising a plurality of data items, the system comprises:

a plurality of servers;

a plurality of replicas of the database wherein the replicas have copies of the plurality of data items, the plurality of replicas corresponding to the plurality of servers;

a plurality of tokens associated with the plurality of data items, wherein possession of a token granted to one of the plurality of servers, referred to as a possessor, grants the possessor permission to update a data item corresponding to the token; and a plurality of token pointers provided in the plurality of servers, the plurality of token pointers corresponding to the plurality of tokens, the plurality of token pointers being updated in the plurality of servers to provide a nexus to the possessor of the corresponding token.

* * * * *

UNITED STATES PATENT AND TRADEMARK OFFICE
CERTIFICATE OF CORRECTION

| | | |
|---|---|---|
| PATENT NO. | : 5,802,062 | Page 1 of 5 |
| APPLICATION NO. | : 08/666772 | |
| DATED | : September 1, 1998 | |
| INVENTOR(S) | : Narain H. Gehani et al. | |

It is certified that error appears in the above-identified patent and that said Letters Patent is hereby corrected as shown below:

In the Drawings, on Sheet 4 of 8, Figure 4:
    Please replace the indicated drawing with the following figure:

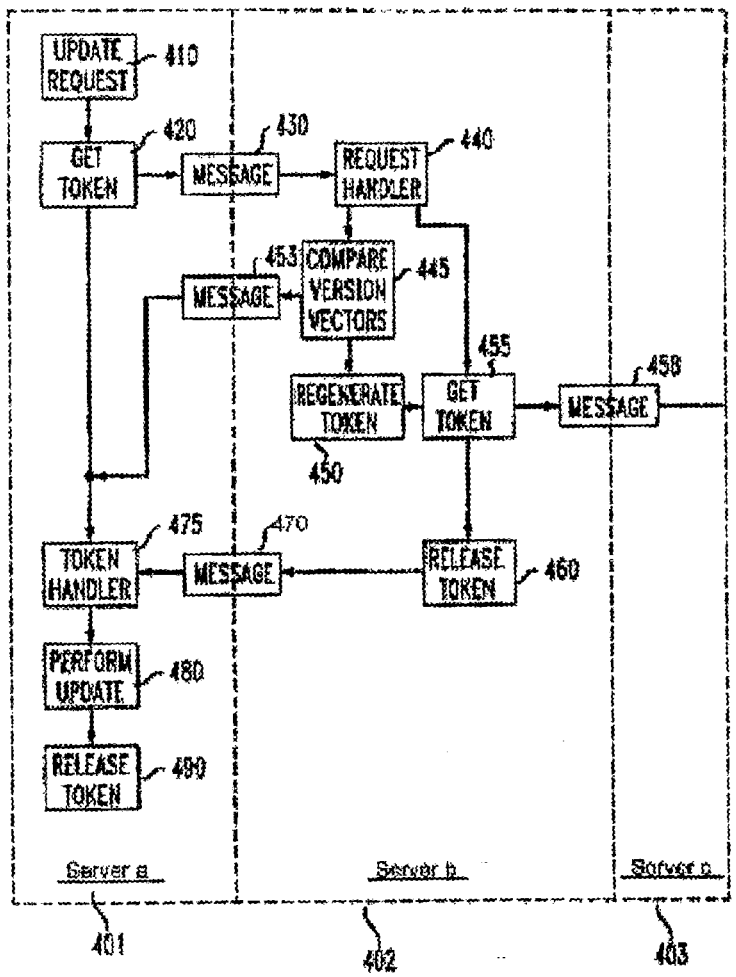

UNITED STATES PATENT AND TRADEMARK OFFICE
CERTIFICATE OF CORRECTION

| | | |
|---|---|---|
| PATENT NO. | : 5,802,062 | Page 2 of 5 |
| APPLICATION NO. | : 08/666772 | |
| DATED | : September 1, 1998 | |
| INVENTOR(S) | : Narain H. Gehani et al. | |

It is certified that error appears in the above-identified patent and that said Letters Patent is hereby corrected as shown below:

In the Drawings, on Sheet 7 of 8, Figure 7:
    Please replace the indicated drawing with the following figure:

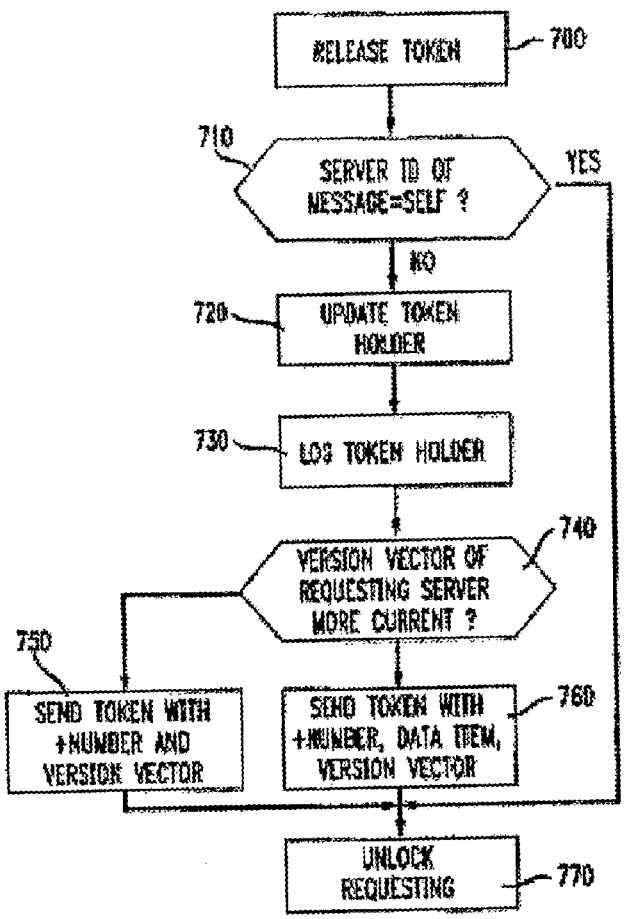

UNITED STATES PATENT AND TRADEMARK OFFICE
CERTIFICATE OF CORRECTION

PATENT NO.        : 5,802,062
APPLICATION NO.   : 08/666772
DATED             : September 1, 1998
INVENTOR(S)       : Narain H. Gehani et al.

It is certified that error appears in the above-identified patent and that said Letters Patent is hereby corrected as shown below:

In the Specification, Column 2, Line 34:
　　Please replace "possessing corresponding" with --possessing a corresponding--

In the Specification, Column 2, Line 57:
　　Please replace "the contents of its" with --the contents of their--

In the Specification, Column 2, Line 60:
　　Please replace "the steps obtaining a" with --the steps in obtaining a--

In the Specification, Column 3, Line 28:
　　Please replace "satellite links." with --satellite links or connections via the internet.--

In the Specification, Column 3, Lines 53-53:
　　Please replace "servers 110, 120, and 130" with --servers 110, 120, 130 and 140--

In the Specification, Column 4, Line 32:
　　Please delete "(e.g.,)"

In the Specification, Column 4, Line 43: j
　　Please replace "$server_1$" with --$server_i$--

In the Specification, Column 4, Line 44:
　　Please replace "$server_1$ s" with --$server_i$'s--

In the Specification, Column 5, Lines 46-47:
　　Please replace "Server 140 releases" with --Server 110 releases--

In the Specification, Column 6, Line 7:
　　Please replace "servers 110" with --server 140--

In the Specification, Column 7, Line 3:
　　Please replace "counter," with --$counter_1$--

In the Specification, Column 7, Line 4:
　　Please replace "age," with --$age_1$--

In the Specification, Column 7, Line 34:
　　Please replace "variable.." with --variable.--

UNITED STATES PATENT AND TRADEMARK OFFICE
CERTIFICATE OF CORRECTION

PATENT NO. : 5,802,062  
APPLICATION NO. : 08/666772  
DATED : September 1, 1998  
INVENTOR(S) : Narain H. Gehani et al.

It is certified that error appears in the above-identified patent and that said Letters Patent is hereby corrected as shown below:

In the Specification, Column 8, Line 64:
   Please replace "concurrent." with --concurrently.--

In the Specification, Column 9, Line 22:
   Please replace "step 710." with --step 610--

In the Specification, Column 9, Line 25:
   Please delete "vvector$_a$"

In the Specification, Column 9, Line 67:
   Please replace "TokenHandler" with --RequestHandler--

In the Specification, Column 10, Line 2:
   Please replace "TokenHandler" with --RequestHandler--

In the Specification, Column 10, Line 6:
   Please replace "server$_a$" with --server$_b$--

In the Specification, Column 10, Line 6:
   Please replace "vvector$_a$" With --vvector$_b$--

In the Specification, Column 10, Line 7:
   Please replace "vvector$_b$" with --vvector$_a$--

In the Specification, Column 10, Line 8:
   Please replace "vvector$_b$'s" with --vvector$_b$--

In the Specification, Column 10, Line 11:
   Please replace "server$_a$ sends" with --server$_b$ sends--

In the Specification, Column 10, Line 11:
   Please replace "server$_b$ at" with --server$_a$ at--

In the Specification, Column 10, Line 18:
   Please replace "server$_a$" with --server$_b$--

In the Specification, Column 10, Line 20:
   Please replace "TokenHandler" with --RequestHandler--

UNITED STATES PATENT AND TRADEMARK OFFICE
CERTIFICATE OF CORRECTION

| | | |
|---|---|---|
| PATENT NO. | : 5,802,062 | Page 5 of 5 |
| APPLICATION NO. | : 08/666772 | |
| DATED | : September 1, 1998 | |
| INVENTOR(S) | : Narain H. Gehani et al. | |

It is certified that error appears in the above-identified patent and that said Letters Patent is hereby corrected as shown below:

In the Specification, Column 10, Line 21:
    Please replace "server. However" with --server$_a$. However--

In the Specification, Column 10, Line 22:
    Please replace "TokenHandler" with --RequestHandler--

Signed and Sealed this

Twenty-first Day of November, 2006

JON W. DUDAS
*Director of the United States Patent and Trademark Office*